Jan. 28, 1969    D. W. DONOVAN    3,424,363
PACKAGES
Filed Oct. 22, 1965
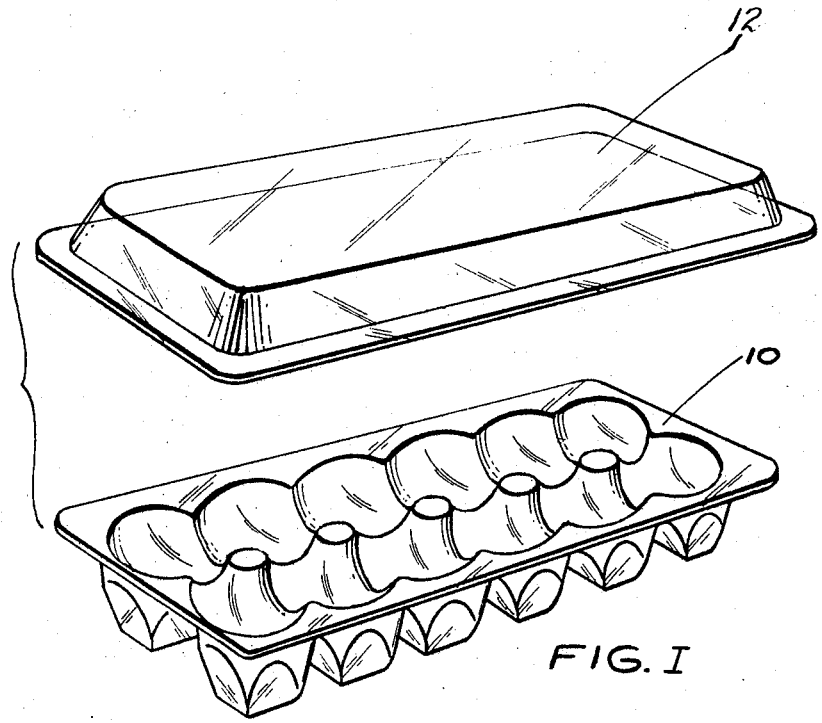
FIG. I
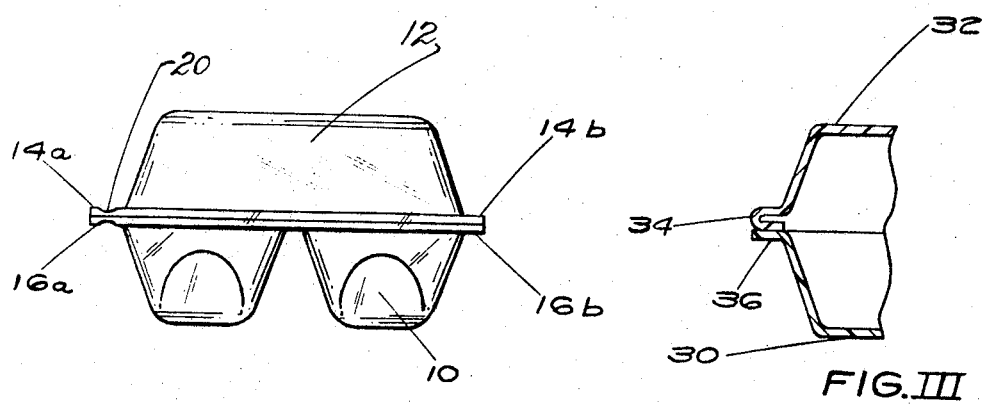
FIG. II
FIG. III
DONALD W. DONOVAN
INVENTOR
BY James C. Logomasini
ATTORNEY

United States Patent Office 3,424,363
Patented Jan. 28, 1969

3,424,363
PACKAGES
Donald W. Donovan, Glastonbury, Conn., assignor to Monsanto Company, St. Louis, Mo., a corporation of Delaware
Filed Oct. 22, 1965, Ser. No. 500,515
U.S. Cl. 229—2.5       3 Claims
Int. Cl. B65d 85/32, 43/16

ABSTRACT OF THE DISCLOSURE

A multi-compartmented package comprising a foamed plastic lower section, and a non-foamed plastic upper section partially heat sealed to the bottom portion.

---

The present invention relates to packages and more specifically to packages having a plurality of compartments or sections for items such as eggs, vegetables, fruit and the like to a method for making same.

It is an object of the present invention to provide a novel and relatively high strength compartmentalized package for small items such as eggs, vegetables, fruit and the like.

Another object of the present invention is to provide a multi-compartment package having a transparent top fabricated.

Another object of the present invention is to provide a muli-compartment package having a transparent top Another object of the present invention is to provide a multi-compartment package having a transparent top. which is partially sealed to a foam plastic bottom.

A further object of this invention is to provide method and means by which to attain the preceding objects.

Other objects of this invention will in part be obvious and will in part appear herein.

These and other objects are attained by a package comprising a multi-compartmented plastic foam bottom section and a top section of transparent plastic, said bottom and top section being at least partially heat-sealed together.

The following drawings are provided for the purpose of illustrating various embodiments of the present invention.

FIG. I is a perspective view of an egg carton having multi-compartment foamed bottom section and a top transparent plastic section.

FIG. II is a side view of an egg carton having multi-compartment foam bottom and a top transparent plastic section heat-sealed to the bottom section partly around their respective contacting edges.

FIG. III is a side view illustrating a hinge.

Referring to the drawings and more specifically to FIG. I, there is schematically shown an egg carton having a foam plastic bottom section 10 and a transparent plastic top section 12. The bottom section 10 is composed of foamed plastic which has been molded to provide depressions shaped to securely hold items such as eggs. The top section 12 is formed from a transparent plastic piece which permits viewing of items retained by the bottom section 10.

Since both the top and bottom portions are of a plastic composition, a rather unique method of securing the sections together has been developed. More specifically, the materials used to construct both the bottom and top sections are selected because they are heat-sealable even though they may differ structurally. A preferred method is to heat-seal along one side of the top and bottom sections such as shown in FIG. II. In FIG. II, lip portions are provided on both sides of the top transparent section 12 and the bottom foam section 10. These are designated in FIG. II as 14a and 14b for the top section and 16a and 16b for the bottom section. As illustrated in FIG. II the lip portions 14a and 14b of the top section 12b abut the lip portions 16a and 16b of the lower section 10 and are heat-sealed together as indicated by the depression lines 20 located on the abutting lip portions 14a and 16a. If the opposite side is not heat-sealed at edges 14b and 16b, then a hinge effect is attained. A more suitable hinge is shown in FIG. III wherein the top section 32 is turned over at one edge producing a rounded portion 34 which is adhered to edge 36 of bottom portion 30. The curve portion 34 lends sufficient flexibility to permit pivoting at this point without rupture along the seam of the container. Any suitable closure device may be utilized at the opposite edge for temporarily locking edges 14b and 14b, for example, spot heat-sealing, locking flaps, etc.

The above description and particularly the drawings are set forth for the purposes of illustration only and not for the purpose of limitation. Although the illustrated embodiment is one having a particular utility for eggs, the package may be formed for the storage, shipment and display of other items such as fruit, vegetable and various fragile and/or ornamental articles such as tree ornaments, toys, confections, baked goods and the like. Consequently, the package may assume a wide variety of shapes and the shape of the individual depressions may vary widely to conform to the contours of irregularly shaped items, for example, square, round, oval, cylindrical and the like.

As earlier indicated, the bottom section of the package is formed from a substantially planar foamed sheet which has been molded to produce a plurality of compartments. The type of plastic that would be used to form the bottom portion of the package may be any plastic which is capable of being manufactured in cellular form and is at least sufficiently rigid to be self-sustaining both before or after the articles are placed therein. Particularly preferred materials are plastic polymers based on styrene monomer. Generally, the thickness of the foamed section will range between about 15 mils to 300 mils.

The top portion of the package is formed of a fairly rigid unfoamed plastic which is transparent and which is sufficiently compatible with the plastic foamed bottom section to be heat-sealable therewith at least at the edges thereof. A particularly preferred plastic material for the top section is biaxially-oriented polystyrene which is fairly rigid and substantially transparent. Other suitable plastics which may be used as the cover are isotactic polyethylene or polypropylene; styrene copolymers, for instance, styrene-acrylonitrile copolymers; polyacrylates, polymethacrylates; polycarbonates; polyvinyl chloride; and polyethylene terephthalates.

The plastic cover can be in the form of a flat sheet or a sheet molded to any desired shape, for instance, by a thermoforming process, such as by vacuum-forming or pressure-forming. The cover is normally relatively thin, generally ranging between 1 to 50 mils and perferably 5 to 30 mils.

Preferably, the top and bottom portions of the package are molded from substantially planar material—the bottom portion being molded from foamed plastic sheet material while the top portion is molded from unfoamed plastic sheet material. Although it is generally desirable to employ the same type of plastic for the top and bottom portions in order to insure optimum heat-sealing, it is possible to select different materials having as good or better heat-sealing characteristics.

As previously indicated in carrying out the process, the top portion may be heat-sealed directly to the edges of the container. If desired, only one side of the top and bottom members may be heat-sealed together to provide a hinge for the top and bottom members to pivot on. The container can then be closed by any suitable catch associated with the opposite side of the container.

The heat-sealing operation is performed at a temperature sufficient to cause fusion of the foamed-unfoamed abutting portions. In the case of biaxially-oriented polystyrene and a foamed polymer material based on styrene the heat-sealing operation is performed at a temperature between 175 and 350° F., preferably between 250 and 300° F., and at a pressure between 5 and 40 pounds per square inch. The pressure depends, of course, to some extent on the temperature—higher pressures being required where the temperature is lower and vice versa. A press can be used for example, which has electrically-heated jaws shaped to conform to the edges of the container. The jaws can be maintained at the sealing temperature by means of thermostat, but preferably there is used an "impulse" heat-sealing method where the jaws are only heated for a brief period of time and then allowed to cool while pressure is still applied. A heating period of up to 5 seconds, for instance between 2 and 4 seconds, is often sufficient; the cooling time can, for instance, be between 1 and 3 seconds.

As can be readily appreciated, the present invention provides a package which is relatively simple to fabricate and which has unique cushioning properties for protecting contained articles from damage due to shock or impact. Furthermore, the package has unique adaptability to high speed production operations primarily because of the ease in which the top and bottom portions may be heat-sealed together to provide a hinge or an air-tight package.

The above description and particularly the drawings are set forth for purposes of illustration only. Many variations and modifications thereof will be obvious to those skilled in the art and can be made without departing from the spirit and scope of the invention herein described.

What is claimed is:

1. A package which comprises a lower section composed of foamed plastic material having a plurality of upwardly opening article receiving compartments therein and a lip at its upper end extending outwardly around the periphery thereof, a cover section of nonfoamed rigid plastic material comprising a generally flat top and planar sides integrally joined to the periphery of the top and depending angularly outwardly therefrom, one of said sides having a U-shaped end portion at its free end, said cover being hingedly connected to the lower section by means of a heat seal between an upper surface portion of the lip of said lower section and an outer surface portion of the A-shaped end portion, to permit opening the package by pivoting the cover section with respect to the lower section along the heat seal, and locking means integrally associated with the lower and cover sections along the side of each which is opposite the side where said hinged connection is located.

2. A multi-compartmented package comprising a bottom section composed of a foamed plastic polymer based on styrene monomer, said bottom having multiple upwardly opening article receiving compartments therein and a generally horizontal, peripheral lip around its upper end, a top section of nonfoamed rigid transparent biaxially oriented polystyrene plastic having a thickness between about 5 to 30 mils, said top section having a generally flat top wall, a pair of elongated planar sidewalls and a pair of planar end walls, each pair depending angularly outwardly from and integrally connected to the periphery of the top wall terminating in a generally radially extending peripheral lip, a portion of the peripheral lip of the top section which extends along one of said sidewalls being hingedly connected along its full extent to the adjacent lip portion of said bottom section by means of a heat seal to permit opening the package by pivoting the top section with respect to the bottom section along the heat seal, and locking means comprising spot heat sealed portions for temporarily locking the opposite sidewall lip portion to the adjacent lip portion of the bottom section.

3. The package of claim 2 wherein the lip portion of the top section which is hingedly connected to the bottom section has an inwardly curled extension, the surface of which is heat sealed to the adjacent lip portion of the bottom section.

References Cited

UNITED STATES PATENTS

| 3,264,120 | 8/1966 | Westcott | 229—2.5 XR |
|-----------|--------|----------|------------|
| 2,154,194 | 4/1939 | Benoit | 229—29 |
| 2,474,391 | 6/1939 | Bergstein. | |
| 2,915,214 | 12/1959 | Frankel | 229—2.5 X |
| 3,043,354 | 7/1962 | Fitzgerald. | |
| 3,082,903 | 3/1963 | Stevens et al. | 229—2.5 X |
| 3,131,846 | 5/1964 | Whiteford | 229—29 X |
| 3,148,103 | 9/1964 | Gallagher | 229—2.5 X |
| 3,217,961 | 11/1965 | Hornbostel | 229—2.5 |
| 3,258,187 | 6/1966 | Greatman | 229—2.5 |

DAVIS T. MOORHEAD, *Primary Examiner.*

U.S. Cl. X.R.

229—29